Nov. 26, 1940.   D. E. SCHOTT   2,222,689
FLUID MOTOR
Filed Sept. 30, 1938
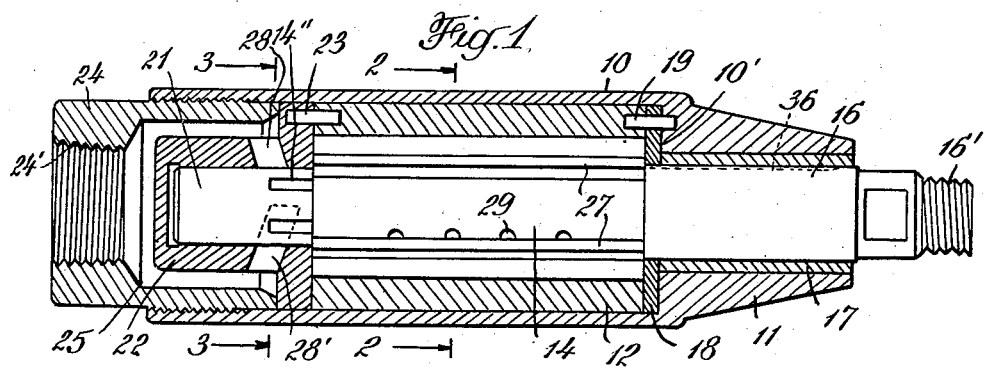
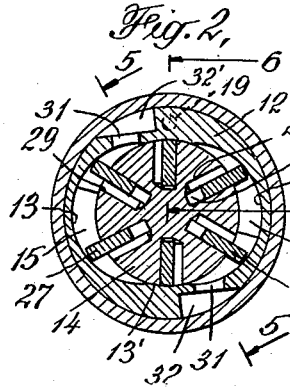
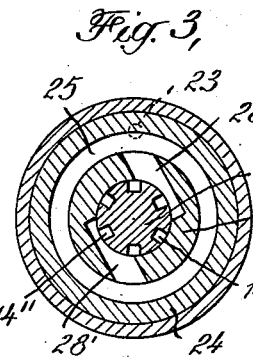
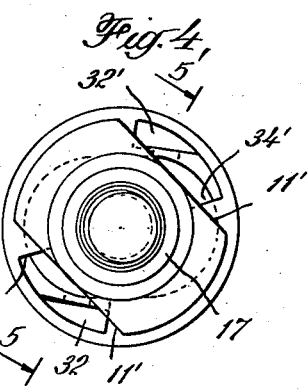
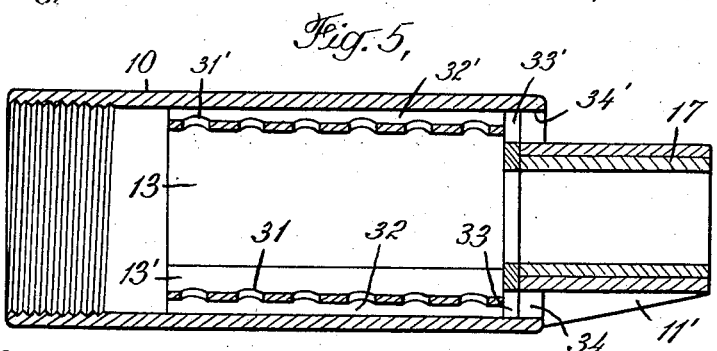
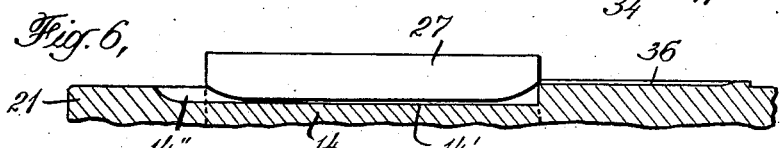
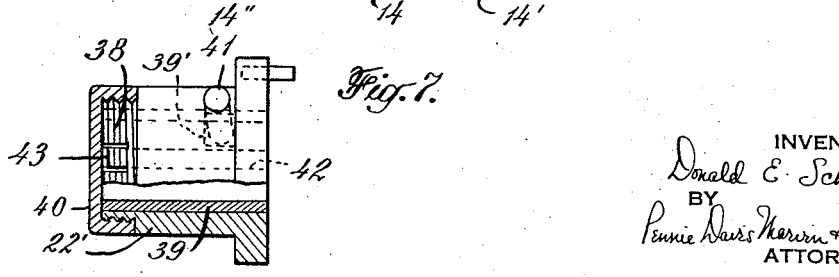
INVENTOR
Donald E. Schott
BY
Pennie Davis Marvin & Edmonds
ATTORNEYS Patented Nov. 26, 1940

2,222,689

UNITED STATES PATENT OFFICE 2,222,689

FLUID MOTOR

Donald Edward Schott, Bronx, N. Y., assignor to Thomas C. Wilson, Inc., New York, N. Y., a corporation of New York Application September 30, 1938, Serial No. 232,589

7 Claims. (Cl. 121—87)

This invention relates to motors and has particular reference to a novel fluid-operated motor. The new motor is of a simple construction adapted for manufacture at low cost and is easy to assemble and to take apart for inspection or replacement of parts. Also, the motor of my invention is compact so that it may be used in restricted spaces, as, for example, in boiler tubes where it is used for operating cleaning devices.

For illustrative purposes the invention will be described and illustrated in the form of a motor operable by compressed air, although it will be understood that the principles of the invention are applicable as well to other forms of motors, such as steam driven motors.

One form of air motor commonly employed heretofore includes a rotor having longitudinal, circumferentially spaced, radial slots, in each of which a blade is mounted for radial movement in the slot. The rotor is mounted in a cylinder or a liner, the internal radius of which is greater than the external radius of the rotor, the rotor being eccentric with respect to the axis of the cylinder so that it contacts the cylinder wall along a line parallel to the cylinder axis and forms with the cylinder a chamber which is crescent-shaped in cross section. As the rotor turns, the blades moving into the chamber are thrown outwardly in the rotor slots against the chamber wall under the action of centrifugal force, and air is admitted into the side of the chamber from which the blades enter and is exhausted through a port near the opposite side of the chamber. When the air is admitted, it is prevented from expanding directly into the exhaust port by the projecting blade in the chamber on one side of the inlet port and by the line contact between the rotor and the cylinder on the other side of the inlet port. Thus, the air, after entering the chamber, expands against the adjacent projecting blade in the chamber and forces it toward the outlet port, thereby turning the rotor. Before the blade reaches the outlet port, the next blade enters the chamber and passes to a position between the inlet and outlet ports, so that when the first blade passes over the outlet port to exhaust the air behind it, the second blade prevents the air which is admitted behind it from expanding directly into the outlet port.

It has been proposed heretofore to improve the operation of motors of this type by so forming the cylinder that when the rotor is mounted therein, it contacts the cylinder wall along two diametrically opposed lines and separates two crescent-shaped chambers, each having the usual inlet and outlet ports. With this construction, the motor is "double-acting" instead of "single-acting", in that each blade is acted on twice by compressed air during a single revolution of the rotor, once in each chamber. While double-acting motors of this type have definite operating advantages over single-acting motors, their commercial use has been limited, at least partly by reason of their relatively high cost. That is, in the manufacture of these motors, the cylinder must be provided with two parallel bores of greater radius than the rotor, one merging into the other, and the inside walls of the cylinder where the bores merge are made tangential to the adjacent curved walls of the bores, as shown in a patent to C. F. Overly, No. 1,104,070. The formation of these tangential portions requires expensive filing operations which must be performed carefully and accurately. Also, the seals formed by engagement of the tangential portions and the rotor, between the inlet and exhaust ports, are merely straight line contacts and accordingly are subject to leakage.

One feature of the present invention, therefore, resides in the provision of a novel double-acting air motor which overcomes these disadvantages of prior motors of this type and which is at once efficient, simple in construction and easy to manufacture. An air motor made in accordance with my invention comprises a cylinder having three parallel bores therein which merge together, one of the bores having a radius equal to that of the rotor and being located between the other two. Accordingly, when the rotor is mounted in the cylinder, the two outer bores form crescent-shaped chambers, one on each side of the rotor, while the walls of the intermediate bore, which join the curved walls of the outer bores, closely engage the rotor on opposite sides over substantial sections of its cylindrical surface, thereby forming effective seals between the two chambers. With this construction, the interior of the cylinder may be formed without the usual filing operations by simply drilling the three bores therein. Also, the cylinder more closely approximates the ideal cylinder in which the blades could move to their outermost positions immediately after the admission of air behind them. That is, in the cylinder of the new motor, each blade, after passing from beneath one of the sealing surfaces of the intermediate bore and beyond the point where air is admitted behind it, approaches its outermost position more rapidly, for equal increments of angular motion, than is possible in a cylinder employing tangential surfaces.

Another feature of the invention resides in the provision of a novel air motor in which the compressed air supplements the action of centrifugal force in urging the blades outwardly in the rotor, and which includes means for valving the air acting on the blades, so that the air is effective to force the blades positively against the walls of the expansion chambers immediately upon passage of the blades into the chambers. In the preferred form of the new motor, the compressed air is admitted into the slots in the rotor at one end thereof and beneath the blades, the admission of air into each slot being controlled so that it starts only when the blade in the slot is retracted under one of the sealing surfaces. The admission may continue, however, after the blade has passed into one of the expansion chambers, at which time the air passes from beneath the blade into the chamber through one or more inlet ports on the expansion side of the blade. The blades and slots are so formed that when a blade is retracted under one of the sealing surfaces, the inlet ports leading from the bottom of the slot are not fully exposed, whereby a back pressure is built up under the blade which, as soon as the blade enters the chamber, is released and urges the blade forcibly against the chamber walls.

It will be apparent that the air admitted into each slot acts first to build up a back pressure in the slot which forces the blade outwardly as it moves into an expansion chamber, and then acts on the blade in the expansion chamber to drive the rotor. While the blade is passing beneath one of the sealing surfaces of the intermediate bore, the air under it has ample time to build up a back pressure which, in conjunction with the centrifugal force acting on the blade, is sufficient to throw the blade outwardly with considerable force against the chamber wall as soon as the blade enters the chamber. Accordingly, the blades, as they pass through the expansion chambers, form better seals between the inlet and exhaust ports than in prior motors of the same type.

These and other features of the invention may be better understood by reference to the following detailed description taken in conjunction with the accompanying drawing, in which Fig. 1 is a longitudinal section through one form of the new motor;

Figs. 2 and 3 are sections on the lines 2—2 and 3—3, respectively, in Fig. 1;

Fig. 4 is an end view of the motor shown in Fig. 1;

Fig. 5 is a longitudinal section on the line 5—5 in Figs. 2 and 4, with the rotor removed;

Fig. 6 is a longitudinal section through part of the rotor on the line 6—6 in Fig. 2, showing the shape of the blades, and Fig. 7 is a side view partly in section showing parts of a modified form of the new motor.

In the drawing, the numeral 10 designates a metallic casing which is generally cylindrical in form and has a hollow hub portion 11 on the front end, the hub being tapered and having diametrically opposed flattened portions 11'. A metal cylinder or liner 12, fitted closely in the casing through the open, rear end thereof, is formed with three bores, two of which, designated 13, are near opposite sides of the liner, and the third of which, designated 13', is centrally located in the liner, the bores being in parallel relation with the bore 13 arranged between and merging with the outer bores. Mounted in the interior of the liner is a cylindrical rotor 14, the main body of which has a radius substantially equal to the radius of the central bore 13. The rotor is fitted closely in the bore 13 so as to form with the liner two crescent-shaped chambers 15 on opposite sides of the rotor, and between the chambers 15 the rotor engages the wall of the central bore at opposite sides over an angle of approximately 25° at each side.

At its front end, the rotor is formed with an integral shaft or spindle 16 which is smaller in diameter than the main body of the rotor and extends through a bushing 17 disposed in the hub 11. At its outer end, the shaft 16 is threaded, as shown at 16', so that it may be connected to the device to be driven. A wear plate 18, through which the shaft 16 extends, is disposed in the front part of the casing and is engaged on one side by the front end of the liner 12 and the corresponding end of the main body of the rotor, and on the opposite side by a shoulder 10' in the casing. The liner, wear plate and casing are held against relative rotary movement by one or more pins 19, each of which extends through an opening in the wear plate and enters aligned recesses in the liner and casing.

At its rear end, the rotor 14 is formed with an integral shaft or spindle 21 which fits closely in a cup-shaped bearing member 22. The base of the bearing member 22 is in the form of an outwardly extending flange and fits closely in the open end of the casing 10 and engages the rear end of the liner 12. The liner and bearing member are held against relative rotation by one or more pins 23, each of which enters aligned recesses in the liner and bearing member. A hollow retainer nut 24 is threaded in the open end of the casing and clamps the bearing member 22 against the liner, the bearing member and nut being so formed as to provide an annular chamber 25 between them. The chamber 25 may be supplied with compressed air through a compressed air line (not shown) threaded in an opening 24' in the rear end of the nut.

The main body of the rotor 14 is formed with a plurality of radial slots 14' extending lengthwise of the rotor and spaced equidistantly around the cylindrical surface thereof. In the motor illustrated, the rotor is formed with six radial slots, but it will be understood that any other desired number may be employed. In each of the slots 14' is a blade 27 which fits closely in the slot and is movable radially therein. Preferably, the blades 27 are made of a light-weight material, such as fiber or Bakelite, although metal blades may be used when desired. As shown particularly in Figs. 1 and 6, the blades are generally rectangular in form and are of a length equal approximately to the length of the main body of the rotor, so that the opposite ends of the blades, which are straight, are in substantial engagement with the wear plate 18 and the bearing member 22, respectively. The blades are of a width such that when they are retracted in the slots by engagement of their outer edges with the wall of the intermediate bore 13' (Fig. 2), there is a slight clearance between the inner edges of the blades and the bottoms of their respective slots.

The spindle 21 is formed with extensions 14'' of the slots 14', the extensions terminating a substantial distance inwardly from the end of the spindle. The slot extensions 14'' cooperate with a pair of inlet openings 28 and 28' in the bearing member 22, which communicate with the annular chamber 25. The inlet openings 28 and 28' are diametrically opposed and each of them subtends an angle of approximately 90° over the part of the spindle 21 in which the slot extensions are formed. Accordingly, compressed air may be supplied from the chamber 25 through the inlet openings 28 and 28' to those slot extensions 14'' which are exposed under the inlet openings, and from the exposed extensions 14'' to the respective slots 14' where the air passes beneath the blades.

The rotor 14 is adapted to be moved in a clockwise direction, as seen in Fig. 2, by compressed air admitted to the chambers 15 through a series of inlet ports 29 communicating with the bottoms of the slots. Each slot is preferably provided with a plurality of ports 29 spaced along its length, the ports being located on the lagging side of the blade in the slot. Each of the ports 29 has a beveled bottom which inclines downwardly toward the corresponding slot 14' and terminates at the bottom of the slot. Thus, when any one of the blades is retracted by engagement with the wall of the central bore 13', as shown in Fig. 2, the inner edge of the blade partially covers the corresponding inlet ports 29 so that the passage of air from the bottom of the slot to the corresponding inlet ports is greatly restricted.

The liner 12 is formed in its cylindrical surface with diametrically opposed grooves which, with the casing 10, provide longitudinal exhaust passages 32 and 32'. The exhaust passages are disposed between the inlet openings 28 and 28', as shown in Figs. 2 and 3, and communicate with the chambers 15 through a plurality of outlet ports 31 formed in the liner. The wear plate 18 is provided with a pair of diametrically opposed, milled notches 33 and 33' which coincide with the passages 32 and 32', respectively, in the liner, and the rear end of the casing is formed with openings 34 and 34' which coincide with the notches 33 and 33', respectively. Accordingly, air may be exhausted from one of the chambers 15 through the exhaust ports 31, passage 32, and openings 33 and 34, and air in the other chamber 15 may be exhausted through outlet ports 31', passage 32' and openings 33' and 34'.

In the operation of the motor, compressed air supplied to the annular chamber 25 passes through the inlet openings 28 and 28' and enters the slot extensions 14'' as the latter pass under the inlet openings. As shown in Figs. 2 and 3, the inlet opening 28 is so positioned in the liner that it commences to supply air to each slot extension 14'' as the corresponding blade 27 moves under the upper wall of the central bore 13' and just before the blade reaches a vertical position. Similarly, the inlet opening 28' is so positioned in the liner that it begins to supply air to each of the slot extensions 14'' as the corresponding blade 27 passes over the lower wall of the central bore 13' and just before the blade reaches a vertical position. The compressed air which is thus admitted into the uppermost and lowermost slot extensions 14'' passes into the small spaces between the bottoms of the corresponding slots and the blades in the slots. Since the blades are retracted by engagement with the wall of bore 13' when compressed air is first admitted to their corresponding slot extensions 14'', the air cannot pass freely from beneath the blades to the corresponding inlet ports 29, and accordingly a back pressure is built up under the blades which urges them outwardly against the wall of bore 13'.

As the rotor continues to turn, each of the blades engaging the wall of the central bore 13' moves toward one of the crescent-shaped chambers 15 and finally passes into the chamber. At this point, the back pressure beneath the blade, as well as the centrifugal force on the blade, act to move the blade outwardly against the wall of the outer bore 13 through which the blade is moved, whereby the inlet ends of the corresponding ports 29 are more fully exposed. At the same time, the outer ends of the corresponding inlet ports 29 move out from under the wall of the central bore 13' and into the chamber 15, so that they are uncovered. Compressed air then passes from the space beneath the blade through the inlet ports 29 to the lagging side of that part of the blade which projects into the chamber 15, the air expanding as it reaches the chamber 15 and urging the blade and rotor in a clockwise direction.

As shown in Fig. 3, the inlet openings 28 and 28' are of such a width that the admission of air to each of the slot extensions 14'' continues until the corresponding blade has traveled approximately 90° from its vertical position. Accordingly, during this movement of the blade, it is subjected at the bottom to the line pressure which urges the blade outwardly against the wall of the liner, and is subjected on its lagging side to the pressure of the expanding air admitted through the inlet ports 29 to the chamber 15. In addition, the blade is subjected to a centrifugal force incident to rotation of the rotor 14, which supplements the action of the air pressure on the bottom of the blade in forcing it outwardly and holding it firmly against the wall of the liner. Thus, any substantial leakage of air between the blade and the liner wall is prevented.

When the blade has traveled 90° from its vertical position under one wall of the central bore 13', it reaches the widest part of the chamber 15 and assumes its outermost position, and thereafter, rotation of the rotor 14 causes the blade to move inwardly and approach one of the series of exhaust ports 31, 31'. As the blade passes over the exhaust ports, the expanded air behind the blade passes through the exhaust ports into one of the exhaust passages 32, 32' and out through the wear plate 18 and the rear end of the casing. The blade then passes under the opposite wall of the central bore 13' to a position where the corresponding slot extension 14'' is under an inlet opening 28, 28', whereupon the cycle is repeated in the other chamber 15.

With this construction, the liner or cylinder 12 may be made expeditiously and at low cost by drilling the bores 13 and 13'. The bores may be ground after the liner has been hardened, thereby preventing leakage of air between the blades and liner due to distortion of the liner resulting from the hardening operation. By employing a liner of the form described, the usual tangential portions connecting the two outer bores are avoided and the expensive filing operation performed in forming these tangential portions is eliminated. Also, the seals between the two chambers 15 are vastly superior to those in prior motors of this type, in that the seals of the new motor are formed by closely fitting surfaces of the rotor and liner, whereas in prior motors, the seals are generally formed by line contacts between the rotor and liner. Another advantage of the liner illustrated is that it permits a more rapid outward movement of the blades for equal increments of angular motion thereof, after they have moved out from under the sealing portions, than is possible with a liner of the type employing straight, tangential portions between the chambers, whereby the blades perform a greater amount of work.

It will be apparent that by providing air inlet means at the ends of the rotor slots, the compressed air may pass into the slots beneath the blades and supplement the action of centrifugal force in holding the blades against the cylinder wall, whereby chattering of the blades and leakage of air between the blades and cylinder wall are more effectively prevented. Since the admission of air to each of the rotor slots is commenced when the corresponding blade is near its vertical position under a wall of the bore 13', a substantial amount of back pressure may be built up in the slot under the blade while the latter is moving along the wall of the bore 13' and before it reaches one of the chambers 15. During this movement of the blade, the outlet ends of the corresponding ports 29 are closed by the wall of the bore 13', and the inlet ends of the ports 29 are substantially closed by the bottom of the blade, so that the desired back pressure under the blade may build up quickly.

If desired, the spindle 16 may be formed with an oil groove 36 forming an extension of one of the rotor slots 14'. Thus, when the slot 14' connected to the groove 36 is supplied with air from its extension 14", which occurs twice during each revolution of the rotor, once at each of the inlet openings 28, 28', oil from the rotor or an oil supply (not shown) is blown by the air along the slot and the groove 36 and eventually seeps out between the bushing 17 and spindle 16 from the end of the groove. The groove, therefore, provides for a positive distribution of oil between the spindle and its bushing.

Instead of employing the bearing member 22 made of a single piece, the bearing shown in Fig. 7 may be employed. As there shown, the bearing is designated by the numeral 22' and is open at its rear end and provided with an integral threaded extension 38. A replaceable bushing 39 is fitted closely in the bearing and may be clamped against the rear end of the main body of the rotor by a cap 40 screwed on the threaded portion 38. The bushing 39 is formed with openings 39' adapted to align with inlet openings 41 in the bearing, corresponding to the openings 28, 28' in the bearing 22. In order that the openings 39' will be properly aligned with the inlet openings 41 in the bearing when the parts are assembled, I prefer to form the bushing 39 with a slot 42 in which an inwardly projecting part 43 of the bearing extends, whereby the bushing and bearing are held against relative rotation. It will be apparent that with the construction shown in Fig. 7, the bushing 39 may be readily replaced by simply unscrewing the cap 40, removing the bushing, and inserting a new bushing in the bearing.

I claim:

1. A fluid-operated motor comprising a cylinder having three parallel bores therein merged together, two of the bores being disposed near opposite sides of the cylinder and the third being substantially centrally located in the cylinder between the other two, a rotor in the cylinder fitted closely in the central bore and forming with the outer bores a pair of crescent-shaped chambers, the rotor having a plurality of longitudinal, radial slots separated from each other and having bottom walls, a blade movable radially in each slot and operable to engage the walls of the bores as the rotor turns in the cylinder, the width of each blade being less than the depth of its slot, means for admitting fluid under pressure into one end of each slot in the space under the corresponding blade when the blade engages the wall of said central bore, the pressure of the fluid urging the blade outwardly against said last wall, means for cutting off the supply of fluid to each slot when the slot travels a predetermined distance beyond said last wall, ports in the rotor for admitting fluid under pressure from beneath each blade to said chambers on the lagging side of the blade to drive the rotor, the inlet end of each port being substantially covered by the corresponding blade when the latter engages the wall of said central bore, whereby back pressure of the fluid is created under the blade, and means for exhausting fluid from said chamber.

2. A fluid-operated motor comprising a cylinder, a rotor in the cylinder including a main body, and spindles projecting from opposite ends of the body, the body having a plurality of longitudinal, radial slots and one of the spindles having extensions of said slots, a mounting for said last spindle having an inlet opening for admitting fluid under pressure into said slot extensions as the latter pass under the opening, a blade movable radially in each of said slots and adapted to engage the cylinder wall, means for admitting fluid under pressure from said slots into the cylinder to act on the blades and drive the rotor, and means for exhausting fluid from the cylinder.

3. A fluid-operated motor comprising a cylinder, a rotor in the cylinder including a main body, and spindles projecting from opposite ends of the body, the body having a plurality of longitudinal, radial slots and one of the spindles having extensions of said slots, a bearing for said last spindle having an inlet opening for admitting fluid under pressure into said slot extensions as the latter pass under the opening, a blade movable radially in each of said slots and adapted to engage the cylinder wall, means for admitting fluid under pressure from said slots into the cylinder to act on the blades and drive the rotor, and means for exhausting fluid from the cylinder.

4. A fluid-operated motor comprising a cylinder having three parallel bores therein merged together, two of the bores being disposed near opposite sides of the cylinder and the third being substantially centrally located in the cylinder between the first two, a rotor in the central bore and forming closely in the central bore and forming with the outer bores a pair of crescent-shaped chambers, the rotor including a main body and spindles projecting from opposite ends of the body, the body having a plurality of longitudinal, radial slots and one of the spindles having extensions of said slots, a mounting for said last spindle having an inlet opening for admitting fluid under pressure into said slot extensions as the latter pass under the opening, a blade movable radially in each of said slots and adapted to engage the walls of the bores as the rotor turns in the cylinder, means for admitting fluid under pressure from said slots into said chambers to act on the blades and drive the rotor, and means for exhausting fluid from said chambers.

5. A fluid-operated motor comprising a cylinder having three parallel bores therein merged together, two of the bores being disposed near opposite sides of the cylinder and the third being substantially centrally located in the cylinder between the first two, a rotor in the cylinder fitted closely in the central bore and forming with the outer bores a pair of crescent-shaped chambers, the rotor including a main body and spindles projecting from opposite ends of the body, the body having a plurality of longitudinal, radial slots and one of the spindles having extensions of said slots, a blade movable radially in each of said slots and adapted to engage the walls of the bores as the rotor turns in the cylinder, a bearing for said last spindle having an inlet opening for admitting fluid under pressure into each of said slot extensions when the corresponding blade is under a wall of said central bore, means for admitting fluid under pressure into one of said chambers from beneath each blade when the blade passes from under said wall into the chamber, and means for exhausting fluid from said chambers.

6. A fluid-operated motor comprising a cylinder, a rotor in the cylinder including a main body and spindles projecting from opposite ends of the body, the body having a plurality of longitudinal, radial slots and one of the spindles having an oil groove forming an extension of one of said slots and adapted to receive oil therefrom, supporting means for said spindles, a blade movable radially in each of said slots and adapted to engage the cylinder wall as the rotor turns in the cylinder, means for admitting fluid under pressure into the end of each slot opposite said grooved spindle as the rotor turns, whereby the fluid pressure forces oil through one of said slots and the oil groove leading from it, means for admitting fluid under pressure from said slots into the cylinder to act on the blades and drive the rotor, and means for exhausting fluid from the cylinder.

7. A fluid-operated motor comprising a cylinder, a rotor in the cylinder including at least one longitudinal slot having a bottom, a blade movable in the slot and adapted to engage the cylinder wall, means for admitting a fluid under pressure into one end of the slot under the blade, the rotor having a port extending outwardly from the bottom of the slot on the lagging side of the blade for admitting fluid into the cylinder to drive the blade, the slot having a part extending upwardly from the bottom to form a seat for the blade above the bottom, the seat and blade forming a valve for cutting off the flow of fluid into the port from the space between the blade and the bottom of the slot when the blade is retracted in the slot, and means for exhausting fluid from the cylinder.

DONALD EDWARD SCHOTT.